Jan. 31, 1939.  G. M. LANE  2,145,659
WINDOW ASSEMBLY FOR VEHICLE BODIES
Filed July 6, 1937  4 Sheets-Sheet 2
FIG. 3.
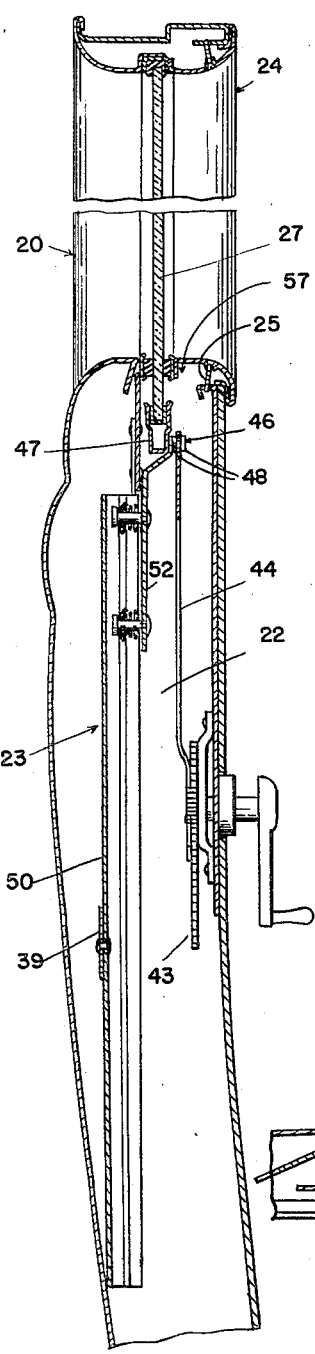
FIG. 6.
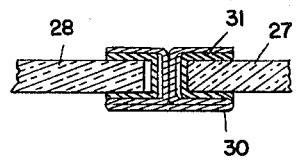
FIG. 7.
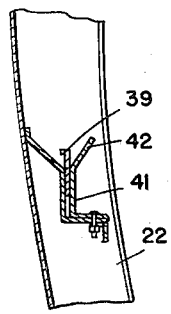
FIG. 8.
FIG. 5.
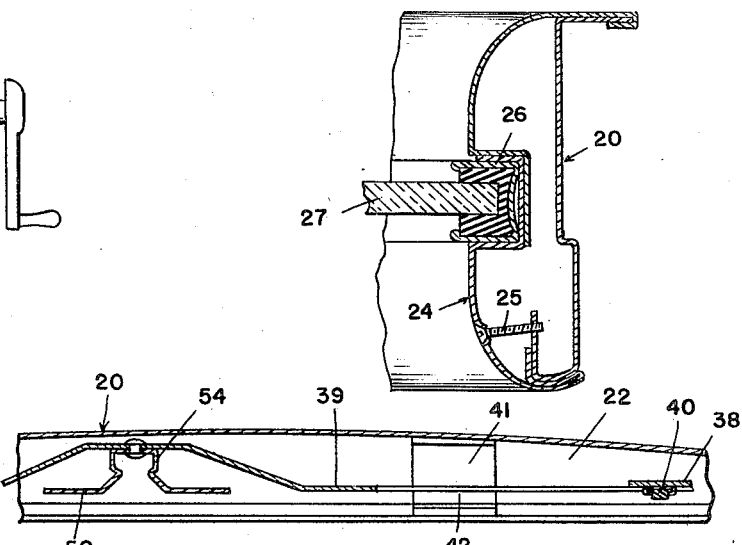
INVENTOR
GUY M. LANE
BY
ATTORNEYS Jan. 31, 1939.    G. M. LANE    2,145,659
WINDOW ASSEMBLY FOR VEHICLE BODIES
Filed July 6, 1937    4 Sheets—Sheet 3

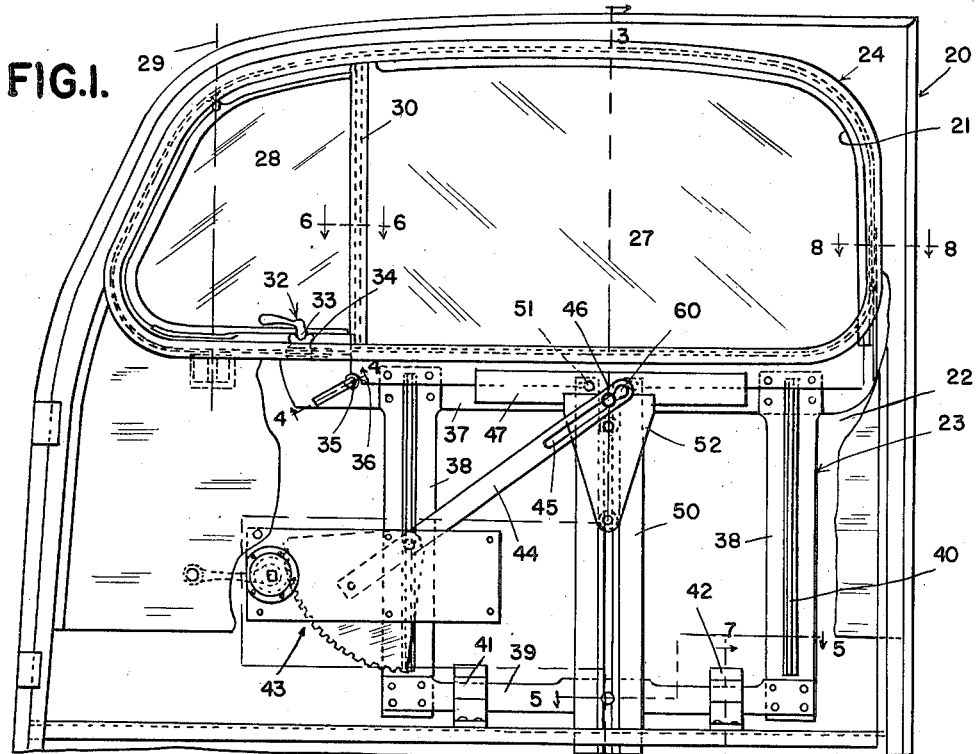

INVENTOR
GUY M. LANE
BY
ATTORNEYS

Jan. 31, 1939. G. M. LANE 2,145,659
WINDOW ASSEMBLY FOR VEHICLE BODIES
Filed July 6, 1937 4 Sheets-Sheet 4
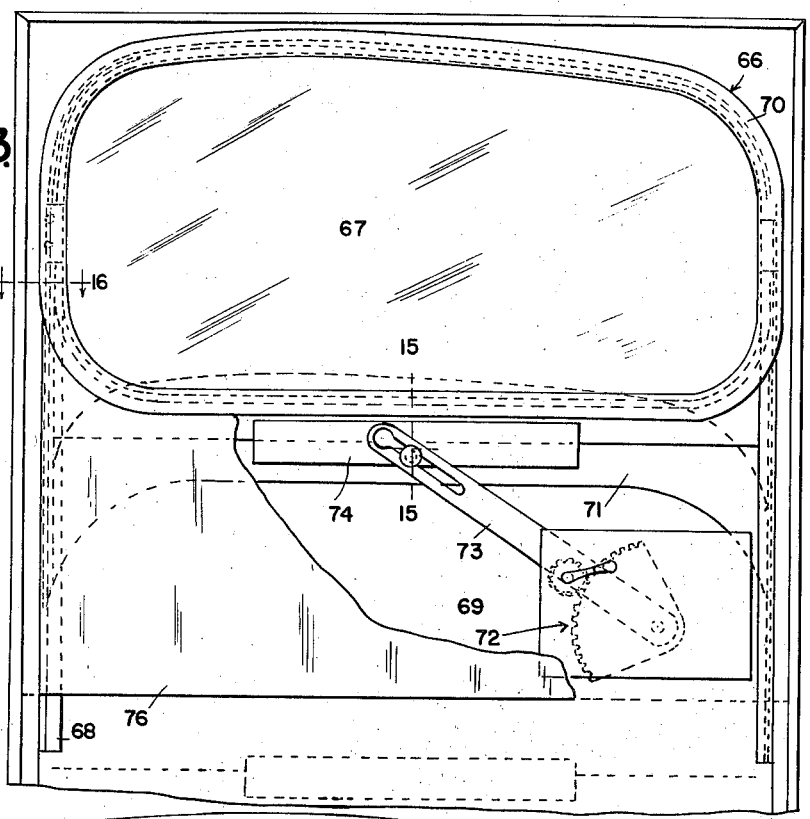
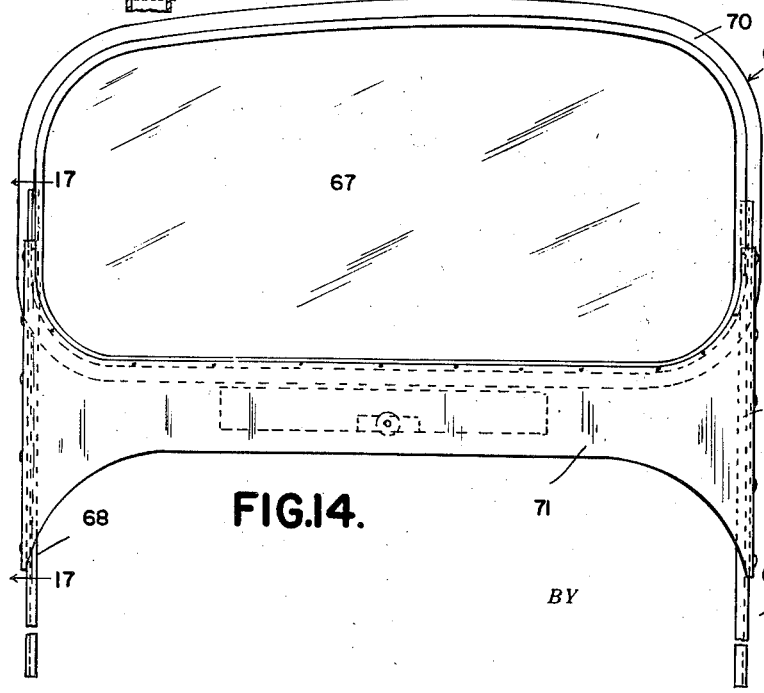
INVENTOR
GUY M. LANE
BY
ATTORNEYS Patented Jan. 31, 1939

2,145,659

UNITED STATES PATENT OFFICE 2,145,659

WINDOW ASSEMBLY FOR VEHICLE BODIES

Guy M. Lane, Detroit, Mich., assignor to Motor Products Corporation, Detroit, Mich., a corporation of New York Application July 6, 1937, Serial No. 152,259

18 Claims. (Cl. 296—44)

This invention relates to vehicle bodies and refers more particularly to improvements in window assemblies for vehicle bodies.

One of the principal objects of this invention resides in the provision of a window assembly capable of being readily installed as a unit in the door or other portion of a vehicle body having a window opening therein. With this arrangement, the window assembly, including the glass panels, may be manufactured at a point remote from the field in which the vehicle body is constructed, and the assembly may be installed as a unit in the finished body or door.

Another object of this invention resides in the provision of a window assembly of the composite type having a vertically slidable panel and a swinging ventilating panel capable of being readily assembled as a unit in the window well of the body beneath the window opening after the body has been completely assembled.

A further object of this invention consists in the provision of a window assembly of the character previously set forth having a frame for the vertically slidable glass panel provided with means for guiding the panel throughout its vertical movement and having provision on the latter means for readily detachable engagement with the window regulating mechanism carried by the body in the window well in the usual manner.

In addition to the foregoing, the present invention contemplates a composite ventilating window assembly capable of being installed as a unit in a vehicle body and comprising means effective upon vertical movement of the sliding glass panel to shift the latter in a direction transverse to the vertical path of travel thereof. In accordance with the present invention, the edge of the vertically movable panel, adjacent the swinging edge of the ventilating panel, is provided with a division bar having a channel adapted to receive the swinging edge of the ventilating panel to lock the latter in its closed position in the window opening, and the means aforesaid functions upon initial downward movement of the sliding panel from its closed position in the window opening to shift the sliding panel in a direction away from the pivoted panel the extent required to release the latter from the division bar.

The foregoing, as well as other objects, will be made more apparent as this description proceeds, especially when considered in connection with the accompanying drawings, wherein:—

Figure 1 is an elevational view, partly broken away, of the inner side of a vehicle door equipped with a window assembly constructed in accordance with this invention;

Figure 2 is an elevational view of the outer side of the window assembly shown in Figure 1;

Figure 9:
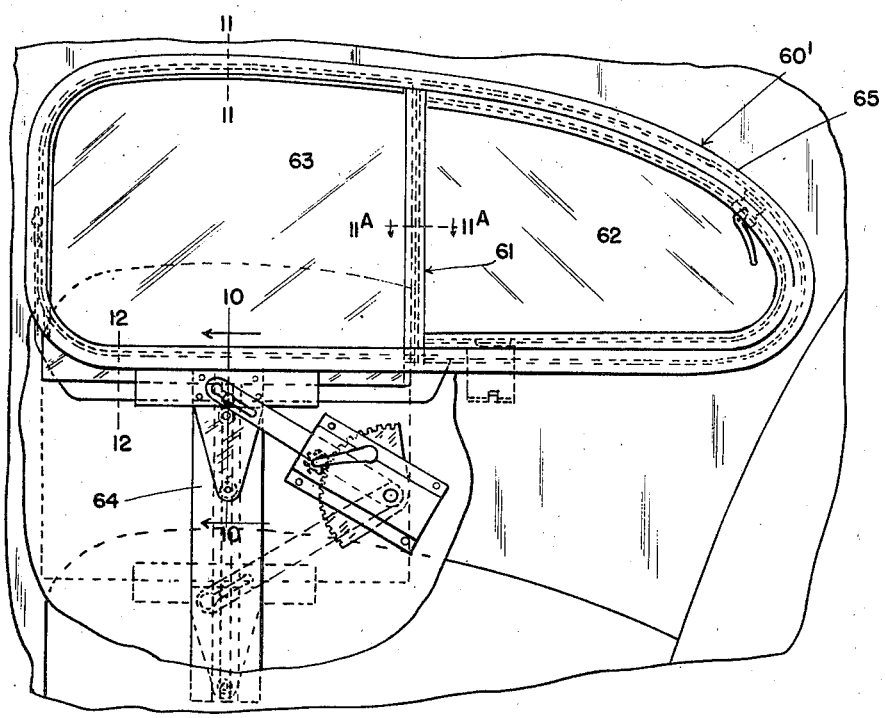
Figure 10:
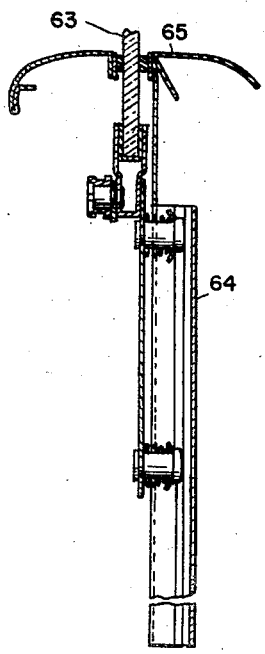
Figure 12:
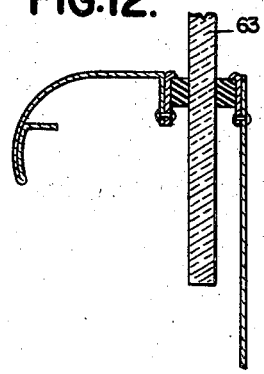

Figures 3 to 8, inclusive, are, respectively, sectional views taken substantially on the planes indicated by the lines 3—3, 4—4, 5—5, 6—6, 7—7, and 8—8 of Figure 1;

Figure 3A is an enlarged sectional view of a portion of Figure 3;

Figure 9 is a fragmentary elevational view of a portion of a vehicle body illustrating a slightly modified form of window assembly;

Figures 10, 11, 11A, and 12 are, respectively, sectional views taken substantially on the planes indicated by the lines 10—10, 11—11, 11A—11A, and 12—12 of Figure 9;

Figure 13 is a fragmentary side elevational view of a vehicle door showing still another embodiment of my invention;

Figure 14 is a side elevational view of the window assembly shown in Figure 13;

Figures 15 and 16 are, respectively, sectional views taken substantially on the planes indicated by the lines 15—15 and 16—16 of Figure 13; and Figure 17 is a sectional view taken substantially on the plane indicated by the line 17—17 of Figure 14.

Referring first to the embodiment of the invention illustrated in Figures 1 to 8, inclusive, and 3A, it will be noted that the reference character 20 in Figure 1 designates a vehicle door of conventional design having a window opening 21 therethrough and having a well 22 formed between the inner and outer panels of the door below the window opening. For the purpose of illustrating this embodiment of the invention, I have shown a closure for the window opening 21 in the form of a composite window of the ventilating type and this window is shown in Figure 2 as forming a part of the window assembly 23. In accordance with the present invention, the window assembly 23 may be readily installed as a unit in the door 20 after the construction of the latter has been completed. The principal advantage of this construction is that the window unit may be manufactured and assembled at a point remote from the plant or department in which the door or vehicle body is constructed. This is desirable in cases where the body manufacturer finds it more expedient to either purchase the window assembly as a unit from some source of supply, or to manufacture the assembly in another plant or department. The manner in which the window assembly 23 may be readily installed in the vehicle body as a unit after the body has been constructed will be more fully described after the description of the particular construction of the window assembly.

In the present instance, the window assembly 23 comprises a garnish molding frame 24 surrounding the window opening 21 and detachably secured to the body or door by means of the screws 25. Upon reference to Figure 8, it will be noted that the garnish molding frame carries an inwardly opening glass channel 26 for the rear vertically movable panel 27. The channel 26 extends along the top and rear sides of the garnish molding frame to receive the adjacent edges of the panel 27 when the latter is in its closed position.

Cooperating with the vertically movable panel 27 to close the window opening 21 is a swinging ventilating panel 28 pivotally supported in the garnish molding frame 24 in advance of the front edge of the panel 27. In accordance with conventional practice, the panel 28 is pivoted in the garnish molding frame for swinging movement about an up and down axis 29 positioned between the front and rear edges of the swinging panel. It will, of course, be understood that one of the pivots is of the friction type so that the ventilating panel 28 may be held in any one of its numerous open positions to secure the desired degree of ventilation.

The adjacent edges of the two panels are separated in the closed positions of the panels by means of a division bar 30, shown in Figure 6 as being substantially H-shaped in cross section and as secured to the front vertical edge of the panel 27. In the closed position of both panels, the rear swinging edge of the pivoted panel 28 engages in the forwardly opening channel 31 of the H bar and is thereby locked against swinging movement. When the sliding panel 27 is in its open or partially open position, the pivoted panel 28 may be latched in its closed position by means of suitable latch mechanism designated generally in Figure 1 by the reference character 32. The latch mechanism 32 comprises a pivoted handle having a dog 33 adapted to be swung into engagement with a suitable keeper plate 34 fixed in any desired manner to the garnish molding frame 24.

In accordance with this invention, the rear edge of the swinging panel 28 is released from the channel 31 upon initial downward movement of the sliding panel 27 and this is accomplished by providing means for shifting the sliding panel 27 rearwardly the distance required to disengage the channel 31 of the division bar 30 from the swinging rear edge of the pivoted panel 28. This shifting movement is accomplished by a roller 35 secured to the window assembly 23 in a position to engage a cam surface 36 on the lower end of the division bar and this cam surface is designed to cooperate with the roller 35 upon initial movement of the panel 27 downwardly to shift the panel 27 rearwardly the distance required to disengage the division bar from the swinging panel 28.

In detail, the roller 35 is secured to a bar 37 extending longitudinally of the bottom edge of the window opening 21 and secured to the garnish molding 24. The bar 37 is provided adjacent opposite ends thereof with downwardly extending guide supporting arms 38 having the lower ends connected by means of a supporting bar 39. The arms 38 are positioned at the outer side of the vertical path of travel of the panel 27 and in Figure 5 are shown as having strips 40 secured to the inner surfaces thereof for engagement with the outer side of the panel 27 adjacent the opposite ends thereof as the same is moved downwardly from its closed position in the window opening. Thus, the strips assist in guiding the panel 27 and form abutments for the panel when the latter is in its lowermost position in the window well. Upon reference to Figure 7, it will be noted that the window assembly is prevented from lateral shifting movement in the window well 22 by means of flexible members 41 secured to the door at the bottom of the well and having opposed flexible fingers 42 adapted to frictionally receive the cross bar 39 therebetween.

Referring now to the means for raising and lowering the panel 27 relative to the window opening 21 in the door, it will be noted from Figure 1 that I have provided a window regulator 43 secured to the door in the well and having a swinging arm 44. The arm 44 is formed with an elongated slot 45 at the swinging end thereof and this slot receives a flanged roller 46 secured in the usual way to a channel 47 which, in turn, is fixed to the bottom edge of the panel 27. The axially spaced flanges 48 on the roller 46 engage opposite sides of the arm to maintain the latter in assembled relation with the roller and the length of the slot 45 in the arm is sufficient to permit the extent of sliding movement of the panel required without binding.

The panel 27 is guided throughout its vertical movement by means of a vertically extending track 50 having the lower end pivoted to the cross bar 39 for swinging movement in a plane parallel to the plane of the window opening and having the upper end secured to the arm 37 of the window assembly by the fastener elements 51. Slidably mounted on the track 50 is a plate 52 having the upper end secured to the channel 47 and having vertically spaced guide elements 53 provided with enlarged heads slidably engaging in the way 54 formed by the track 50. With this construction, the panel 27 is accurately guided throughout its vertical movement relative to the window opening 21.

It has been stated above that the panel 27 is shifted rearwardly by the roller 35 upon initial downward movement of the panel from its closed position and, since the plate 52 is secured to the panel 27, it follows that this plate will shift with the panel. To provide for this shifting movement, the fastener elements 51 extend through slots 55 in the arm 37 and these slots are elongated to permit the extent of swinging movement of the track 50 about its pivotal connection with the cross bar 39 required to release the division bar 30 from the swinging edge of the ventilator 28.

Reference has been made above to the fact that the window assembly unit described above and shown in Figure 2 may be installed in the door after the latter has been completely constructed. This is accomplished by merely inserting the lower ends of the bars 38 and track 50 into the space 57 provided between the inner and outer panels of the door at the lower side of the window opening. The entire assembly is then lowered relative to the door until the cross bar 39 is engaged between the spring fingers 42 of the positioning means 41 in the door. In this connection, attention may be called to the fact that the upper extremities of the spring fingers are flared laterally outwardly in opposite directions to effectively guide the bar 39 therebetween.

Inasmuch as the regulating mechanism is carried by the door and the channel 47 is carried by the window assembly, it follows that some provision must be made during assembly of the window unit to attach the free end of the swinging arm 44 to the roller 48. In the present instance, the free end of the elongated slot 45 in the arm 44 is formed with an enlarged opening 60. This opening is of sufficient dimension to permit the innermost flange 48 of the roller to be extended therethrough during the time the window assembly is inserted between the inner and outer body panels. In actual practice, before the window assembly is installed in the door, the regulator 43 is manipulated to locate the free end of the arm 44 in its uppermost position where it may be conveniently manipulated to assemble the same with the window panel.

Figure 11:
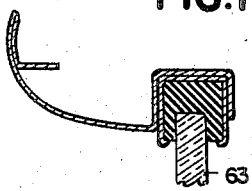
Figure 11A:
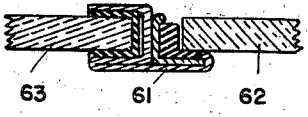

In the embodiment of the invention illustrated in Figures 9 to 12, inclusive, the window assembly 60' is shown as being assembled in the side portion of the vehicle body proper and differs from the window assembly previously described in that the division bar 61 is shown in Figure 11A as being of the type which merely forms an abutment for the swinging edge of the pivoted panel 62 and does not function to lock this panel in its closed position. As a consequence, the vertically sliding glass panel 63 is not shiftable transversely to the direction of vertical sliding movement and the guiding member 64, depending from the bottom section of the garnish molding frame 65, is rigidly secured to the molding, as distinguished from the guiding member 50 in the first described form of the invention which is shiftable to compensate for shifting movement of the sliding panel 27. In addition, the guides 38 are eliminated in the window assembly 60' and these guides may be eliminated without interfering with the operation of the panel 63 by reason of the fact that the latter is relatively short, as compared to the panel 27. With the above exceptions, the window assembly 60' is identical in construction to the window assembly previously described and may be installed as a unit in the vehicle body in the same manner as the first described form of the invention.

The embodiment of the invention illustrated in Figures 13 to 17, inclusive, differs from both of the foregoing modifications in that the pivoted panel is omitted from the window assembly 66 shown in Figure 14 and the sliding panel 67 is guided at opposite edges thereof by means of channels 68 extending into the window well 69 from opposite sides of the garnish molding frame 70. The upper ends of the channels are rigidly secured to the front and rear sides of the garnish molding frame 70 and are braced at the lower side of the molding by means of a plate 71 having the opposite ends rigidly secured to the channels. The panel 67 is operated by means of a window regulator 72 secured in the well 69 and the swinging end of the arm 73 of the regulator mechanism is assembled with the channel 74 at the bottom edge of the panel 67 in the same manner as the regulator arm 44 is assembled with the channel 47 in the first described form of the invention. With this construction, the regulator arm 73 may be assembled with the channel 74 as the channel guides 68 are inserted between the inner and outer body panels 75 and 76, respectively.

While the three embodiments selected for the purpose of illustrating this invention differ structurally from each other, nevertheless, it will be noted that each of the embodiments disclose a window assembly wherein the vertically slidable glass panel and the guide means therefor form a unit capable of being readily installed in the vehicle body. It will also be noted that in each embodiment of the invention, provision is made for readily attaching the window regulating arm to the vertically sliding panel as the latter is installed in the body. In addition, it will be observed that each embodiment of the invention comprises a relatively few simple parts capable of being readily manufactured, assembled, and installed as a unit.

What I claim as my invention is:

1. The combination with a vehicle body having a window opening and having a well below the window opening provided with laterally spaced panels, of a window assembly installed in the body as a unit and comprising, a closure movable from a position in the window opening to a position in said well and having guide means forming a unit therewith and insertable into the well through the space provided between the body panels at the lower side of the window opening during the interval the closure is lowered into registration with the window opening.

2. The combination with a vehicle body having a window opening and having a well below the window opening provided with laterally spaced panels, of a window assembly installed in the body as a unit and comprising a frame for the window opening, a closure supported in the frame for sliding movement from a position in the window opening to a position in said well, guide means for the closure depending from the frame and adapted to be inserted into the well through the space provided between the body panels at the lower side of the window opening during the interval the frame and closure are moved as a unit into registration with the window opening, and means for demountably securing the frame to the body.

3. The combination with a vehicle body having a window opening and having a well below the window opening provided with laterally spaced panels, of a window assembly installed in the body as a unit and comprising a frame for the window opening, a closure supported in the frame for sliding movement from a position in the window opening to a position in said well, guide means for the closure depending from the frame and adapted to be inserted into the well through the space provided between the body panels at the lower side of the window opening during the interval the frame and closure are lowered into registration with the window opening, and means fixed in the well and cooperating with the guide means to position the latter in said well.

4. The combination with a vehicle body having a window opening and having a well below the window opening provided with laterally spaced panels, of a window assembly installed in the body as a unit and comprising a frame for the window opening, a closure supported in the frame for sliding movement from a position in the window opening to a position in said well, guide means for the closure depending from the frame and adapted to be inserted into the well through the space provided between the body panels at the lower side of the window opening during the interval the frame and closure are lowered into registration with the window opening, and means effective upon inserting the guide means into the well to yieldably grip a portion of the guide means and secure the latter against lateral displacement in said well.

5. The combination with a vehicle body having a window opening and having a well below the window opening provided with laterally spaced panels, of a window assembly installed in the body as a unit and comprising a frame for the window opening, a closure supported in the frame for sliding movement from a position in the window opening to a position in said well, guiding means extending from the bottom side of the frame to a position adjacent the bottom of the well and having a member cooperating with means on the closure to guide the latter, and opposed spring fingers secured in the well and yieldably gripping a portion of the guiding means to secure the guiding means against lateral displacement relative to the well.

6. The combination with a vehicle body having a window opening and having a well below the window opening provided with laterally spaced panels, of a window asembly installed in the body as a unit and comprising a frame for the window opening, a closure supported in the frame for sliding movement from a position in the window opening to a position in said well, a guiding member extending from the bottom side of the frame to a position adjacent the bottom of the well, a cooperating member carried by the closure and engageable with the guiding member to guide the closure throughout its sliding movement, said members being insertable into the well through the space provided between the spaced body panels at the lower side of the window opening at the time the frame and closure are lowered as a unit into registration with the window opening, and regulating mechanism secured to the body in the well and detachably engageable with said closure for operating the latter.

7. The combination with a vehicle body having a window opening and having a well below the window opening provided with laterally spaced panels, of a window assembly installed in the body as a unit and comprising a frame for the window opening, a closure supported in the frame for sliding movement from a position in the window opening to a position in said well, a guiding member extending from the bottom side of the frame to a position adjacent the bottom of the well, a cooperating member carried by the closure and engageable with the guiding member to guide the closure throughout its sliding movement, said members being insertable into the well through the space provided between the spaced body panels at the lower side of the window opening at the time the frame and closure are lowered into registration with the window opening, and regulating mechanism secured to the body in said well and having a swinging arm detachably engageable with the second named member aforesaid.

8. The combination with a vehicle body having a window opening and having a well below the window opening provided with laterally spaced panels, of a window assembly installed in the body as a unit and comprising a frame for the window opening, a closure in the frame supported for sliding movement from a position in the window opening to a position in said well, a guiding member extending from the bottom side of the frame to a position adjacent the bottom of the well, a cooperating member carried by the closure and engageable with the guiding member to guide the closure throughout its sliding movement, said members being insertable into the well through the space provided between the spaced body panels at the lower side of the window opening at the time the frame and closure are lowered into registration with the window opening, regulating mechanism secured to the body in said well and having a swinging arm detachably engageable with the second named member aforesaid, and means also secured in the well and effective upon lowering the guiding members into said well to yieldably position said members in the well.

9. A vehicle body window assembly comprising, a frame, a glass panel mounted for both vertical sliding movement relative to the frame and for shifting movement in a direction transverse to the direction of sliding movement aforesaid, means for guiding said panel throughout its vertical movement including a part secured to the bottom edge of the glass panel, a second part depending from the lower side of the frame and slidably engaged by the first part, and means securing the second part to the assembly permitting shifting movement of said second part with the glass panel.

10. A vehicle body window assembly comprising, a frame, a glass panel mounted for both vertical sliding movement relative to the frame and for shifting movement in a direction transverse to the direction of sliding movement aforesaid, means carried by the frame and effective upon initial vertical movement of the glass panel from a position in the frame to shift said panel in a transverse direction, a guiding member depending from the lower side of the frame and shiftable relative to the frame with said glass panel, and a second guiding member carried by the glass panel and cooperating with the first named member to guide said glass panel throughout its vertical travel.

11. A vehicle body window assembly comprising, a frame, a glass panel mounted for vertical sliding movement into and out of the frame, members depending from opposite ends of the bottom section of the frame at one side of the glass panel and engageable with the latter side of said panel, and cooperating engaging means respectively secured to the bottom section of the frame and lower edge of the glass panel for guiding the latter throughout its vertical travel.

12. A vehicle body window assembly comprising, a frame, a glass panel mounted for both vertical sliding movement relative to the frame and for shifting movement in a direction transverse to the direction of sliding movement aforesaid, members depending from opposite ends of the bottom section of the frame at one side of the glass panel and engageable with the latter side of said panel, a supporting bar connecting the lower ends of said members, means for guiding the glass panel throughout its vertical travel including cooperating engaging guiding members respectively secured to the glass panel and frame, the member carried by the frame having its lower end pivoted to the supporting bar and having its upper end connected to the frame for shifting movement with the glass panel relative to the frame.

13. A vehicle body window assembly comprising, a vertically slidable glass panel, a panel cooperating with said first panel to form a closure and mounted for swinging movement about an up and down axis, a frame for said panels, a division bar fixed to one of said panels and having a channel-shaped portion receiving the adjacent edge of the other panel to lock the pivoted panel in its closed position in said frame, means carried by said frame and effective upon initial movement of the sliding panel out of the frame to shift the latter panel in a direction to release the pivoted panel, a guiding member depending from the frame and shiftable relative to the frame with said sliding panel, and a cooperating guiding member carried by the sliding panel and slidably engageable with the first member to guide the sliding panel throughout vertical movement thereof.

14. The combination with a vehicle body having a window opening therein and having laterally spaced panels below the window opening defining a well, of a window assembly installed in the body as a unit and comprising, a frame having top, bottom and side bars cooperating with each other to define the window opening, a closure supported in the frame for sliding movement from a position in the window opening to a position in said well, guide means for the closure extending downwardly from the bottom bar of the frame and fixed to said frame, said guide means adapted to be inserted into the well through the space provided between the body panels at the lower side of the window opening during the interval the frame and closure are lowered into registration with the window opening, and means demountably securing the frame to the body.

15. The combination with a vehicle body having a window opening and having laterally spaced panels below the window opening defining a well, of a window assembly installed in the body as a unit and comprising, a frame having top, bottom and side bars cooperating with each other to define the window opening, a closure supported in the frame for sliding movement from a position in the window opening to a position in the well, a guide member forming a unit with the closure and extending downwardly from the lower edge of the closure, a cooperating guide member extending downwardly from the bottom bar of the frame and engageable with the guide member on the closure to guide said closure throughout its sliding movement, said guide members adapted to be inserted into the well through the space provided between the body panels at the lower side of the window opening during the interval the frame and associated closure are moved into registration with the window opening.

16. The combination with a vehicle body having a window opening therein and having laterally spaced panels below the window opening defining a well, of a ventilating window assembly installed in the body as a unit and comprising, a frame having top, bottom and side bars cooperating with each other to define the window opening, a closure supported in the frame for sliding movement from a position in the window opening to a position in said well, a second closure mounted in the frame for swinging movement about an up and down axis, and guide means for the sliding closure extending downwardly from the bottom bar of the frame and fixed to said frame, said guide means adapted to be inserted into the well through the space provided between the body panels at the lower side of the window opening during the interval the frame and both of said panels are moved into registration with the window opening.

17. The combination with a vehicle body having a window opening and having laterally spaced panels below the window opening defining a well, of a window assembly installed in the body as a unit and comprising, a frame having top, bottom and side bars cooperating with each other to define the window opening, a closure supported in the frame for sliding movement from a position in the window opening to a position in said well, a pair of members secured to the bottom bar of the frame adjacent opposite ends of the frame and extending downwardly from the bottom bar to one side of the path of travel of the closure and having portions frictionally engageable with said closure, a guide member secured to the bottom bar of the frame between the members aforesaid and extending downwardly from said bottom bar, and guide means on the lower edge of the closure cooperating with the guide member to guide the closure throughout its sliding movement, said members adapted to be inserted into the well through the space provided between the body panels at the lower side of the window opening during the interval the frame and panel are moved into registration with the window opening.

18. A vehicle body window assembly comprising, a vertically slidable glass panel, a panel cooperating with the first panel to form a closure and mounted for swinging movement about an up and down axis, a frame for said panels, a division bar fixed to one of said panels and having a portion engageable with the adjacent edge of the other panel in the closed position of both panels to form a seal between said edges, means effective upon initial movement of the sliding panel from its closed position to shift the sliding panel in a direction to separate the adjacent edges of the panels, a guiding member depending from the frame and shiftable relative to the frame with the sliding panel, and a cooperating guiding member carried by the sliding panel and slidably engaging the guiding member aforesaid to guide the sliding panel throughout its vertical movement.

GUY M. LANE.